US009434033B2

(12) United States Patent
Novak et al.

(10) Patent No.: US 9,434,033 B2
(45) Date of Patent: Sep. 6, 2016

(54) HOLE CUTTER WITH EXTRUDED CAP (75) Inventors: Joseph Thomas Novak, East Longmeadow, MA (US); Robert Richard Zielonka, Enfield, CT (US); William B. Korb, Broad Brook, CT (US)

(73) Assignee: Irwin Industrial Tool Company, Huntersville, NC (US)

( * ) Notice: Subject to any disclaimer, the term of this patent is extended or adjusted under 35 U.S.C. 154(b) by 1425 days.

(21) Appl. No.: 12/687,102

(22) Filed: Jan. 13, 2010

(65) Prior Publication Data

US 2011/0170965 A1    Jul. 14, 2011

(51) Int. Cl.
B23B 51/04 (2006.01)
B23P 15/28 (2006.01)
B21K 25/00 (2006.01)

(52) U.S. Cl.
CPC .............. *B23P 15/28* (2013.01); *B21K 25/00* (2013.01); *B23B 51/0406* (2013.01); *B23B 51/0473* (2013.01); *Y10T 29/49* (2015.01); *Y10T 408/895* (2015.01)

(58) Field of Classification Search
CPC .......... Y10T 408/895; B23B 51/0473; B23B 51/0406
USPC ............ 408/203.5, 204, 205, 206, 207, 703, 408/209, 67
See application file for complete search history.

(56) References Cited

U.S. PATENT DOCUMENTS

| | | | |
|---|---|---|---|
| 993,938 A | 5/1911 | Achert | |
| 2,473,077 A * | 6/1949 | Starbuck, Jr. | 408/206 |
| 3,138,183 A * | 6/1964 | Stewart | 408/206 |
| 3,365,926 A | 1/1968 | Price | |
| 3,837,759 A | 9/1974 | Bittern | |
| 3,854,840 A | 12/1974 | Miyanaga | |
| 4,036,560 A | 7/1977 | Clark et al. | |
| 4,148,593 A | 4/1979 | Clark | |
| 4,422,811 A | 12/1983 | Ellison et al. | |
| 4,669,928 A * | 6/1987 | Mediavilla | 408/68 |
| 4,968,189 A * | 11/1990 | Pidgeon | 408/1 R |
| 5,076,741 A * | 12/1991 | Littlehorn | 408/68 |
| 5,597,274 A | 1/1997 | Behner | |
| 6,120,221 A * | 9/2000 | Alm | 408/204 |
| D478,106 S | 8/2003 | Morton et al. | |
| 6,676,711 B2 * | 1/2004 | Omi | 83/847 |
| 6,887,018 B2 * | 5/2005 | Ostermeier | 408/204 |
| 6,939,092 B2 | 9/2005 | Korb et al. | |

(Continued)

OTHER PUBLICATIONS

Hendrick, Art "Regaining Flatness in Stamped Parts" Dec. 7, 2004. Stamping Journal (2004) 125.*

(Continued)

*Primary Examiner* — Eric A Gates
*Assistant Examiner* — Paul M Janeski
(74) *Attorney, Agent, or Firm* — Sutherland Asbill & Brennan LLP (57) ABSTRACT

A hole cutter having an extruded plate cap and methods and apparatuses for making such caps and hole cutters. The plate cap has planar opposing external and internal surfaces with an extruded hub extending axially inwardly from the internal surface. An aperture extends axially through the hub from the external surface. At least a portion of the aperture can be threaded for threaded engagement with a driving arbor. The hub is long enough so that the threaded portion contains at least two full threads. A blade body with a cutting edge is attached to the cap to form a hole cutter.

43 Claims, 9 Drawing Sheets

(56) References Cited

U.S. PATENT DOCUMENTS

| | | |
|---|---|---|
| 7,073,797 B2 | 7/2006 | Gaul |
| 7,073,992 B2 | 7/2006 | Korb et al. |
| 7,264,428 B2 | 9/2007 | Cossette |
| 2004/0013482 A1* | 1/2004 | Gillet et al. ................ 408/204 |
| 2005/0025591 A1* | 2/2005 | Korb et al. ................ 408/204 |
| 2005/0025593 A1* | 2/2005 | Korb et al. ................ 408/206 |
| 2006/0263156 A1 | 11/2006 | Cossette |
| 2009/0226270 A1 | 9/2009 | Novak et al. |

OTHER PUBLICATIONS

International Search Report for International Application No. PCT/US2011/021212 mailed Mar. 9, 2011.

Written Opinion of International Searching authority for International Application PCT/US2011/021212 mailed Mar. 9, 2011.

* cited by examiner

HOLE CUTTER WITH EXTRUDED CAP

FIELD OF THE INVENTION

The present invention relates to hole cutters for cutting a variety of work pieces, such as wood and metal, and more particularly, to hole cutters with extruded caps.

BACKGROUND INFORMATION

A typical prior art hole cutter, also known as hole saw, has a circular base with a cylindrical blade body extending axially therefrom, and defining a plurality of cutting teeth or saw teeth on the cutting edge of the blade body. The base typically has a central hole, often threaded, and multiple pin drive holes around the central hole for engaging an arbor for driving the hole cutter. Example of drive arbors are provided in U.S. Pat. No. 7,073,992, which is incorporated by reference in its entirety.

Hole cutters are often fabricated by forming the base in the form of a circular cap and then attaching, such as by welding, the blade body. Such caps are often formed either by machining plate material or by draw-forming sheet material. With a plate-type cap, the arbor hole is formed through the thickness of the plate and threaded for engagement with the arbor. The cap defines a peripheral flange and a recess for receiving the blade body. The blade body is attached, such as by welding, to the cap. In order for the cap to have sufficient strength, and the arbor hole to have sufficient length so that the threaded length of the hole is sufficient for secure engagement to the arbor, the plate material is at least about 0.187" thick. Examples of plate cap hole cutters are shown in U.S. Pat. Nos. 6,939,092 and 7,264,428, which are incorporated by reference in their entireties. While plate cap hole cutters possess good strength and dimensional accuracy, the thick plate material entails material cost and the machining process for forming the recess and arbor and drive holes requires expensive machining equipment. The machining process is also relatively time consuming.

A sheet-type cap is formed using a sheet material, such as sheet metal, that is no more than about 0.111" thick. The peripheral rim of the cap is formed by drawing the edges of the sheet metal blank into cup-like shape, and machining a recess into the peripheral edge of the cup for attachment to the blade body. The drawing process involves using pulling/tensile forces applied to the sheet metal to flow and stretch the material into the desired shape. The thinness of the sheet material does not permit the arbor hole to be threaded. Therefore, the arbor hole is also drawn inwardly (in the same direction as the cup-shaped portion) to form a hole of sufficient length to be threaded for arbor engagement.

Drawn sheet metal caps are less costly in both material and manufacturing costs than plate-type caps, in part because sheet material is thinner than plate. However, sheet metal cap hole cutters have several performance disadvantages compared to plate-type caps. As they are made from thinner material, they are not as rigid as plate-cap hole cutters and subject to stress and deformation during cutting due to cutting forces. These forces are most severe at the arbor hole and deformation of the cap can cause undesirable arbor wobble. This is a particular issue with larger diameter hole cutters. In addition, the edges of the drawn arbor hole at the external side of the cap are rounded as a result of the drawing process, and the arbor does not set flush against the cap and/or the internal diameter of the arbor hole, potentially contributing to flex or arbor wobble. Moreover, the draw-forming process is less precise, making attaching the blade body potentially more difficult and resulting in a dimensionally less true hole cutter (out of round).

SUMMARY OF THE INVENTION

Accordingly, it is an object of the present invention to overcome one or more of the above-described drawbacks and/or disadvantages of the prior art.

It is another object of the invention to provide a hole cutter with the strength and dimensional accuracy of plate cap hole cutters with less material and manufacturing cost.

In a first aspect, the present invention is directed to a caps for hole cutters or hole saws for cutting a work piece. The hole cutters may be configured to cut various work piece materials, such as metal, wood, plastic, resin and other materials, and are driven by an arbor attached to the hole cutter. In certain embodiments, the cap is a plate material such as steel defining substantially planar opposing external and internal surfaces, a periphery defining a flange, and a recess between the opposing surfaces defining a "B" diameter. An extruded hub extends axially inwardly from the internal surface and defines an aperture extending through the plate cap and hub. The aperture has a threaded portion extending along at least a portion of its length, and the hub extends axially inwardly from the internal surface a sufficient distance such that the threaded portion defines at least two full threads. The threaded portion may engage an arbor. In some embodiments, the threaded portion is axially offset from the external surface.

In various embodiments, the cap has a plate thickness at locations outside the hub but inside the "B" diameter of at least about 0.134". The thickness of the extruded hub is preferably at least about 0.187". Caps according to the invention with such hub thicknesses and plate thicknesses of between about 0.134" and 0.165" provide significant strength improvements over drawn sheet metal caps, comparable to thicker plate caps without an extruded hub.

In some embodiments, portions of the external and/or internal surface are stippled with small recesses. In various embodiments, the recesses define pyramid shapes, which may be cut at 45° angles in both directions. A central portion of the external surface may be left unstippled, such as around arbor drive pin holes, pilot holes, and stamped indicia at that location.

In a second aspect, the invention relates to hole cutters having extruded plate caps as discussed above, with an annular or circular blade body extending axially from the periphery of the cap. The blade body defines a cutting edge at a distal end from the cap. The cutting edge may define a plurality of cutting teeth for cutting the work piece material when the hole cutter is rotated in the cutting direction about its axis.

Other aspects of the invention are directed to methods of fabricating hole cutter plate caps with extruded hubs. Embodiments of hole cutter plate caps of the invention may be fabricated by:

a. forming a cap blank from plate steel to define generally planar first and second opposing surfaces;

b. forming an aperture though the blank extending from the first surface to the second surface and defining an axis that is substantially perpendicular to the first and second surfaces;

c. extruding the blank at the aperture to form a hub extending along the axis from the first surface and past the second surface, wherein the aperture extends through the hub; and d. threading at least a portion of the aperture to form a threaded portion configured for engagement with an arbor. The hub is extruded sufficiently past the second surface such that the threaded portion defines at least two full threads. In some embodiments, the hub is extruded to be at least 0.187" thick. In some embodiments, a portion of the first and/or second surfaces is stippled, as described above, with a punch.

A first diameter of the cap may be formed between the first and second surfaces, such as by a coining process, which also may form a flange at a periphery of the cap blank. A second diameter of the cap defining the outer diameter of the fabricated cap may be formed at this periphery, such as by machining or trimming the periphery of the cap blank as necessary. In certain embodiments, the thickness of the cap plate after coining is at least 0.134", and may be between about 0.134" and 0.165".

Yet further aspects of the invention are directed to apparatuses for fabricating hole cutter plate caps with extruded hubs. In some embodiments, the apparatuses are a fabrication line and include: first means for forming a cap blank from plate steel defining generally planar first and second opposing surfaces, such as a blanking station; second means for forming an aperture though the blank extending from the first surface to the second surface and defining an axis that is substantially perpendicular to the first and second surfaces, such as a piercing station; third means for extruding the blank at the aperture to form a hub extending along the axis from the first surface and past the second surface, wherein the aperture extends through the hub, such as an extruding station; and fourth means for threading at least a portion of the aperture to form a threaded portion configured for engagement with an arbor, such as a tapping station. The third means or extruding station is configured to extrude the hub sufficiently past the second surface such that the threaded portion defines at least two full threads. In various embodiments, the extruding station has a forming punch, an extrusion punch, and a press, which either presses the cap blank against the extrusion punch or the cap blank into the forming punch, and in certain embodiments, can extrude the hub to a thickness of at least 0.187".

In further embodiments, the fabrication line has fifth means to form the "B" diameter of the cap. The firth means may be a coining station, which coins the "B" diameter, such as by pressing a die against the cap blank. The coining means may also form a flange at a periphery of the cap, from which the "A" diameter may be formed, such as by trimming means at a trimming station, which may include a recessed die and press. In certain embodiments, after coining, the cap plate may have a thickness of at least about 0.134", and may be between about 0.134" and 0.165".

The fabrication line may further include stippling means such as a stippling station to stipple the first and/or second surfaces or portions thereof. The stippling station may include at least one punch with a plurality of raised points or knurls. Knurls in the form of pyramid shapes, such as those cut at 45° angles, will form corresponding recesses in the caps. As discussed above, where stippling is not desired in a certain portion of the cap surface(s), the stippling punch may be provided without knurls at that location.

Other objects and advantages of the hole cutters and hole cutter caps of the present invention, and/or of the currently preferred embodiments thereof, will become more readily apparent in view of the following detailed description of the currently preferred embodiments and the accompanying drawings.

DETAILED DESCRIPTION OF EMBODIMENTS OF THE INVENTION

Figure 1:
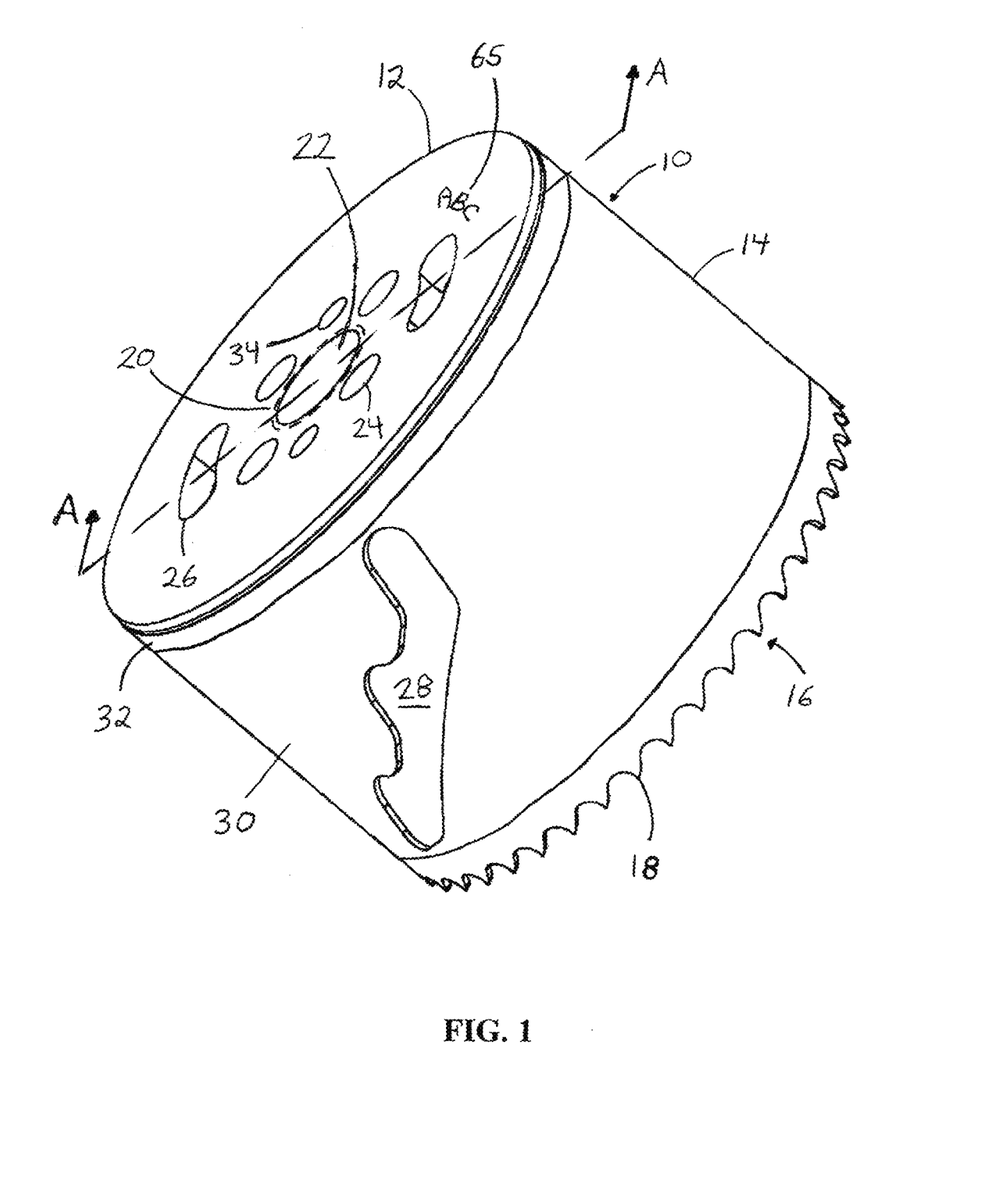
FIG. 1 is a perspective view of a hole cutter in an embodiment of the present invention.
Figure 2:
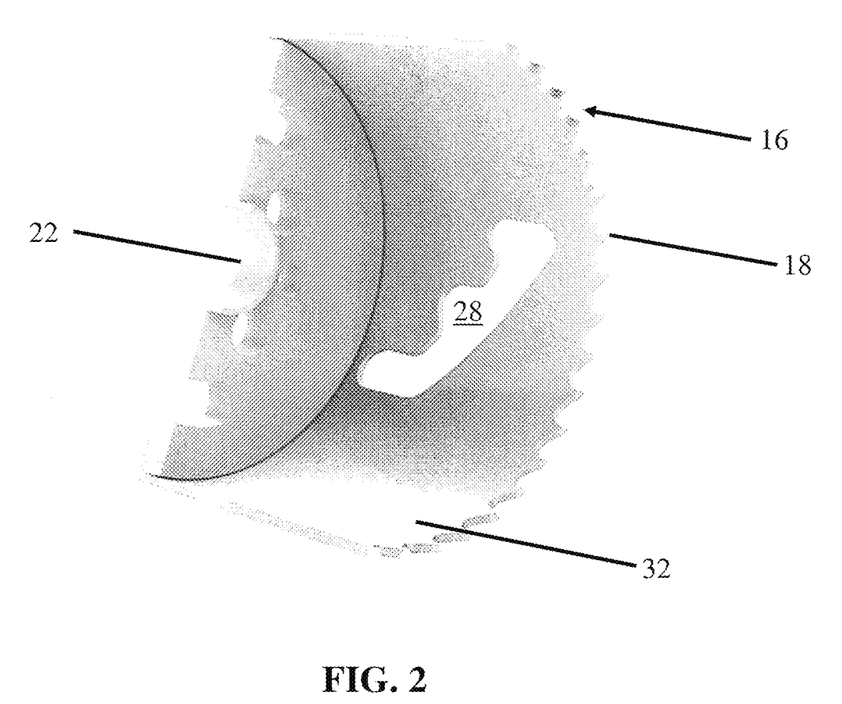
FIG. 2 is a perspective cross-sectional view of a hole cutter in the embodiment of FIG. 1 along section line A-A.

In FIGS. 1 and 2, a hole cutter embodying the present invention is indicated generally by the reference numeral 10. The term "hole cutter" is used herein to mean a tool that cuts holes in work pieces, such as wood, metal or other work pieces, and includes without limitation hole saws. The hole cutter 10 includes a cap 12 and a cylindrical or annular blade body 14 extending axially from the cap. The blade body 14 is fixedly secured, such as by welding, to the cap 12.

The blade body 14 has a cutting edge 16 at its distal end opposite the cap 12 and a plurality of cutting teeth 18. The cutting teeth 18 are configured to cut into a work piece when the cutter 10 is applied to a work piece and rotated about the axis of rotation Y in a cutting direction. Presently preferred configurations of the cutting edge and cutting teeth are provided in the following co-pending patent applications assigned to the assignee of the present invention and are hereby expressly incorporated by reference in their entireties as part of the present disclosure: the U.S. patent application filed on even date herewith, and entitled "Hole Cutter with Minimum Tooth Pitch to Blade Body Thickness Ratio." However, as should be understood by those of ordinary skill in the pertinent art based, the cutting edge 16 and cutting teeth 18 may be defined by any of numerous different tooth forms or other cutting edge forms that are currently known or that later become known. In some embodiments, the cutting edge 16 is a bi-metal cutting edge, wherein the tips of the teeth 18 are formed by a relatively hard metal, such as tool steel, and the other portions of the teeth and blade body 14, and the cap 12, are made of relatively softer steel, such as carbon steel.

The cap 12 has a central hub 20 with a axially-located arbor hole 22 therethrough that is sized and configured to engage an arbor (not shown) and a plurality of drive pin apertures 24 substantially equally spaced relative to each other about the central hub 20 for engaging the drive pins of the arbor. While the depicted embodiment contains four drive pin apertures 24, it should be understood that more or fewer drive pin apertures may be provided, depending upon the desired configuration of the hole cutter and arbor.

The cap 12 also has a pair of angularly extending slug removal apertures 26 spaced about 180° apart on opposite sides of the hub 20 relative to each other. The angularly extending slug removal apertures 26 are dimensioned and positioned to allow insertion therein of a tool, such as a screwdriver, to facilitate work piece slug removal. The blade body 14 defines a plurality of slug removal slots 28 formed through the side wall of the thereof, also sized and configured for receiving therethrough a tool or lever, such as a screw driver, for removal of a work piece slug located within the interior of the blade body 14. Presently preferred configurations for such slots 28 are described in the co-pending patent applications assigned to the assignee of the present invention and are hereby expressly incorporated by reference in their entireties as part of the present disclosure: the U.S. patent application filed on even date herewith, and entitled "Hole Cutter with Chip Egress Aperture;" the U.S. patent application filed on even date herewith, and entitled "Hole Cutter with Axially-Elongated Aperture Defining Multiple Fulcrums," and the U.S. Design Application filed on even date herewith, and entitled "Hole Saw." While the present embodiment has two slug removal apertures and two slug removal slots in the depicted sizes and configurations, the hole cutter may contain any number of such apertures and/or slots in different sizes and configurations, or even no apertures or slots, depending upon the cutting application.

The hole cutter 10 contains surface coatings 30, 32 to protect the cutter 10 against corrosion and rust and/or for decorative or advertising purposes, such as here with the manufacturer's distinctive color(s), trade dress, trademarks and logos. Coating 30 is an angularly and axially extending colored coating defining a first boundary adjacent to the cutting edge and axially spaced therefrom. Coating 32 is an oxide finish, which is located on the cutting edge 16, the end of the blade body 14 opposite the cutting edge 16, the cap 12, and the interior surface of the hole cutter 10. Presently preferred configurations for the coatings 30, 32 are described in the following co-pending patent applications assigned to the assignee of the present invention and are hereby expressly incorporated by reference in their entireties as part of the present disclosure: the U.S. patent application filed on even date herewith, and entitled "Coated Hole Cutter;" the U.S. Design application filed on even date herewith, and entitled "Hole Saw;" U.S. Design application No. 29/334, 248, filed Dec. 24, 2009 and entitled "Hole Saw Blade;" and U.S. Design Pat. D551,269, entitled "Hole Blade." While the present embodiment shows particular coatings and coating configurations, those of ordinary skill in the pertinent art should understand that various coatings and coating configurations may be utilized.

The cap 12 may further have one or more pilot holes 34 that are used in manufacturing the cap as described below. The pilot holes 34 in the illustrated embodiment have a diameter that are smaller than the drive pin holes 24 so that the arbor drive pins may not engage the pilot holes. Though the embodiment shown in FIG. 1 has two pilot holes, caps with fewer or more pilot holes, or none, are within the scope of the invention.

Figure 3A:
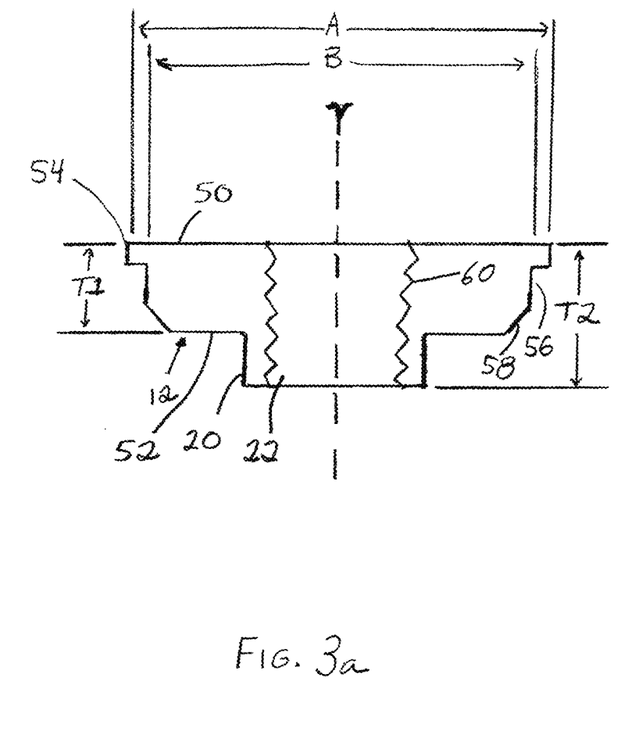
FIG. 3a is a schematic cross-sectional side view of the cap of the embodiment of FIG. 1 according to the present invention.

Referring also to FIG. 3a, cap 12 is a plate material, such as steel plate, with a substantially planar external surface 50 and an opposing substantially planar internal surface 52. The illustrated embodiment shows the external surface 50 and the internal surface 52 substantially parallel each other. The cap 12 has a plate thickness T1 between the external surface 50 and the internal surface 52 of at least about 0.134". In alternative embodiments, the cap 12 has a plate thickness of between about 0.134" and 0.165". Thus, the cap 12 thickness is greater than that of previously known sheet metal caps but less than that of previously known plate caps. The external surface 50 of the cap 12 defines a periphery defining a flange 54 having a diameter "A." The cap defines a recess 56 axially-inwardly from and between the external surface 50 and the internal surface 52 and defining a diameter "B" of the cap at the radially inward extent of the flange 54. A tapered portion 58 extends between the recess 56 and the internal surface 52. The recess 56 and tapered portion 58 are configured to engage a complementary-configured end of the blade body 14, which is attached to the cap 12 by known methods, such as welding. The thickness of the flange 54, depth and axial length of the recess 56, and configuration of the tapered portion are dependent upon the size of the hole cutter, the hole cutter material(s), the method of attachment of the blade body and the cutting application (e.g., metal, wood, etc.). Those of ordinary skill in the pertinent art will understand how to dimension and configure these portions of the cap 12, as they are not unique to caps of the present invention compared to existing caps. For example, for a 51 mm hole cutter, the flange 54 may have a thickness of 0.0548", while the tapered portion may have an axial length of 0.0457" and be tapered at a 35° angle.

The hub 20 extends axially-inwardly from the cap plate 12 beyond the internal surface 52. The arbor hole 22 extends through the hub 20 from the external surface 50 and contains threads 60 for engaging threads of the driving arbor. As shown in FIG. 3a, the threaded hub 20 defines at least two full thread lengths for secure engagement of the arbor and preventing stripping of the threads. With a single thread pitch of 18, for example, the axial length of the thread is at least ⅛" (0.112"). In addition, the shown hub 20 extends beyond the internal surface 52 so that the overall thickness of the hub T2 is about 0.187" as measured from the external surface 50.

As should be noted, when an 18-pitch thread is used, the thickness of the hub 20 is greater than necessary to contain two full threads 60. It is thus possible to for the hole 22 to contain more than two full threads. Alternatively, or in addition, as shown in FIG. 3b, part of the hole may remain unthreaded.

Figure 3B:
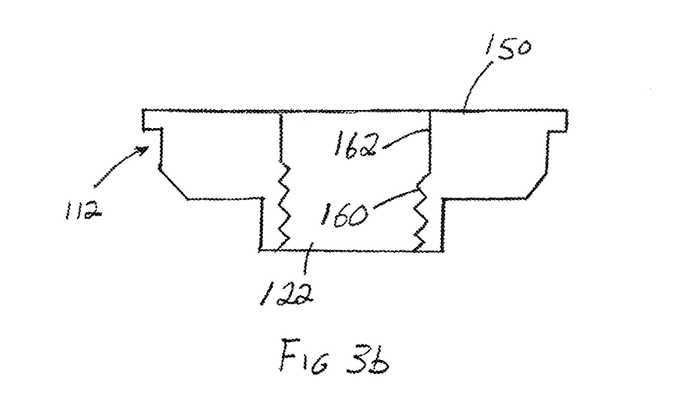
FIG. 3b is a schematic cross-sectional side view of another embodiment of a hole cutter plate cap according to the present invention.

The hole cutter cap shown in FIG. 3b is similar to the cap of FIGS. 1, 2 and 3a, and utilizes similar reference numerals to reference similar parts, but with the reference numerals preceded by a "1." An upper portion 162 of the hole 122 may remain unthreaded, such that the threaded portion 160 of the hole 122 is axially-offset from the external surface 150. This permits an unthreaded portion of the hole 122 adjacent to the external surface to closely engage the arbor for added stability. Even three full 18-pitch threads would permit the threaded portion 60 to be offset from the external surface 150 with a hub thickness T2 of 0.187".

Caps of the present invention may be made by performing the following steps:
  a) blanking the cap;
  b) piercing the arbor hole and pilot holes (if present);
  c) extruding the hub;
  d) squaring the arbor hole;
  e) tapping the arbor hole
  f) forming the "B" diameter; and
  g) forming the "A" diameter.

Figure 4:
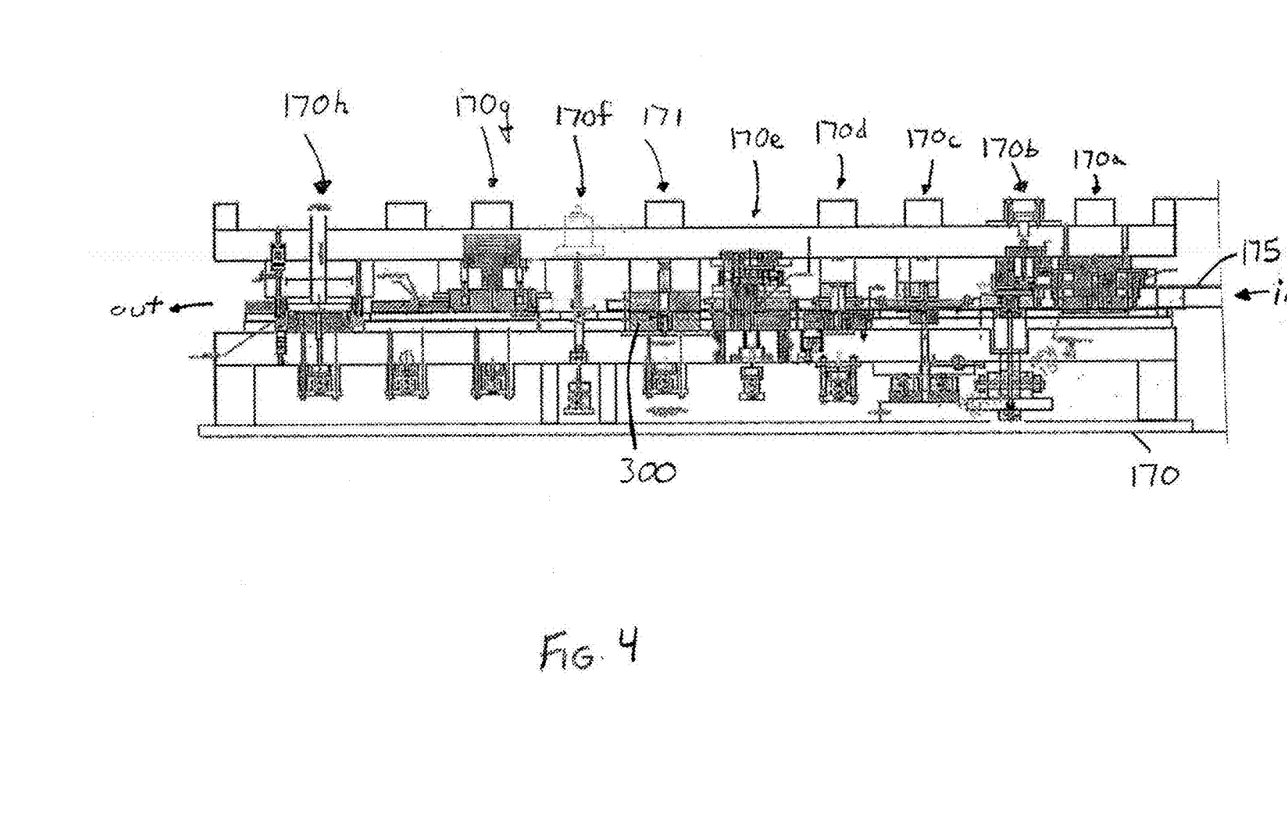
FIG. 4 is a schematic elevation view of an embodiment of a fabrication line for fabricating hole cutter caps according to the present invention.

FIG. 4 schematically shows a fabrication line 170 for producing caps in the present invention. The fabrication line 170 has stations at which machines performs various operations in the fabrication of the caps. Though the fabrication line 170 is shown in FIG. 4 as having the stations compactly placed near each other in linear and sequential arrangement, it is contemplated that other fabrication facilities may be used.

In a blanking station 170a, the cap 12 is blanked from the plate stock 175 by known methods, such as by a cutter or punch. In the shown embodiment, the plate stock strip 175 is continuously fed into the blanking station 170a and blanks are successively cut from the strip. However, other means of providing the plate stock, such as are known, are contemplated within the scope of the invention The cut blanks are of sufficient diameter so to provide the resulting cap with the desired dimensions and configuration after the blank is worked and cut during the fabrication process.

The blanks are moved through the blanking station to a stamping and cut scrap station 170b by the continuing feed of the plate stock, though they can be moved by other means as are known to those of ordinary skill in the art. In the depicted embodiment, whereas the cap is made of steel, a magnetic holder (not shown) carries the blank to the next station. However, other means, such as suction, mechanical transport, etc., may be used as is known. At this point, the scrap plate stock from which the blank was removed is cut from the end of the strip feed and discarded or recycled.

In the embodiment shown in FIG. 1, the cap 12 is stamped with indicia 65. In alternative embodiments, the indicia include size, logos, identification numbers, or other indicia that may be used during the manufacturing process, e.g., optical recognition.

Next, at a piercing station 170c, the central arbor hole 22 and any pilot holes 34 are formed. In the presently depicted embodiments, they are pierced through the blank by punches. The die in such embodiments is configured so that scrap plugs from the arbor and pilot holes fall out of the die into the scrap collection apparatus so that the cap travels to an extrusion 170d station without first requiring removal of the plugs.

At the extrusion station 170d, the central hub 20 containing the arbor hole 22 is extruded axially-inwardly on the cap 12 so that it extends past the internal surface of the cap 52 by the desired amount. That is, the hub 20, which includes the arbor hole 22 therein, is extruded to a sufficient degree so that the arbor hole 22 may be threaded with at least two full threads. In the embodiments shown in the Figures, the hub is sufficiently extruded such that the overall thickness of the hub T2 is at least about equal to the thickness of existing plate-type hole cutter caps. For example, the thickness T2 is at least 0.187" inches as in previously existing caps. The pilot holes 34 may be used to position the cap during the extrusion process.

Figure 5:
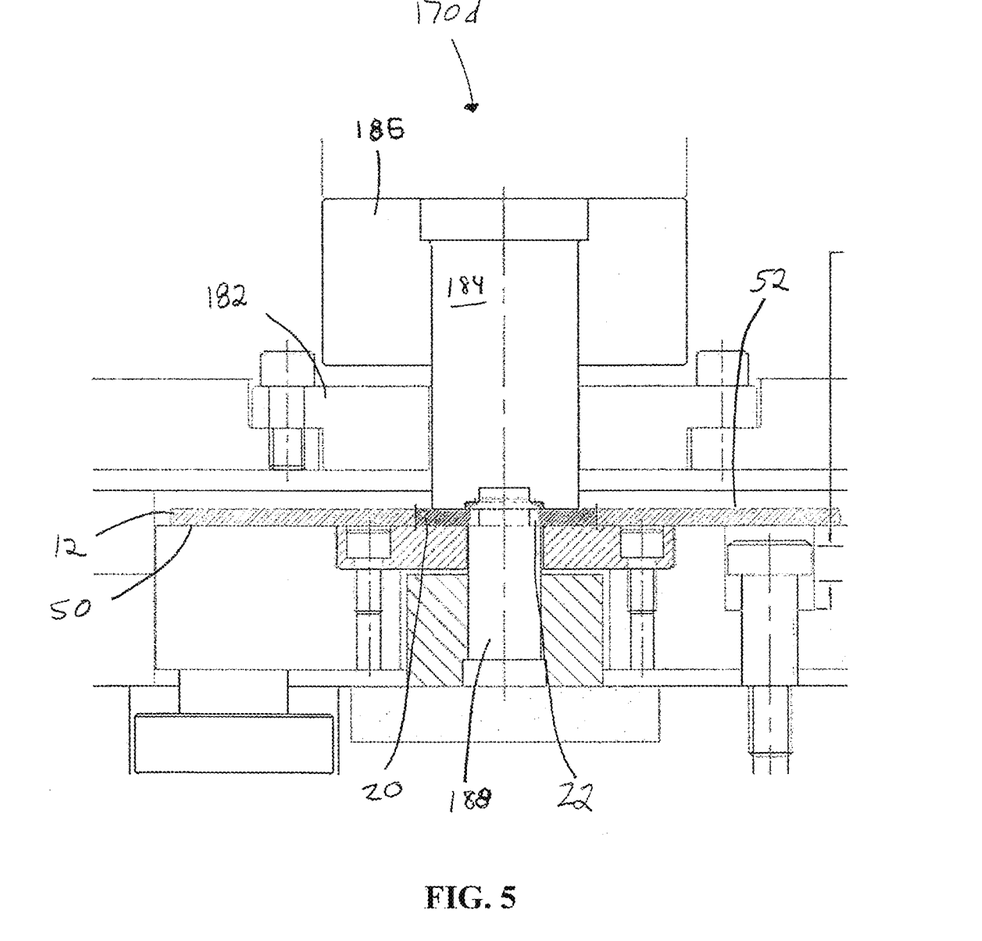
FIG. 5 is a schematic cross-sectional elevation view of an embodiment of a hub extrusion station according to the present invention.

The extrusion process of the present invention differs significantly from the drawing process of sheet metal-type hole cutter caps. As discussed above, the hubs of drawn caps are formed by pulling and stretching the material. In contrast, in an extrusion process the material is pushing the material, such as forcing it with or onto a punch in conjunction with a die. In the depicted methods, a forming punch 182 defining a die 184 is moved by a die press 186 against the work piece (cap) to press the cap 12 against a stationary extrusion punch 188, extruding the hub. Alternatively, the hub can be extruded by pressing the extrusion punch against the cap and into a stationary die.

Extrusion, while more costly in terms of fabrication machinery, has several advantages over drawing. First, due to the fact that the part is extruded using a punch and die, more consistent and predictable material flow, and thus, dimensions (in this case, wall thickness of the hub), are obtained. This is relevant to both the strength and stability of the hub during cutting. Further, again because a punch and die are used, the interface between the external surface of the cap and the arbor hole is more defined, in this application more square (forming a defined 90° angle) than the more rounded interface resulting from a drawing process. The more defined interface achieved by the invention provides for better (closer) arbor engagement at the interface, resulting in better stability and less wobble during cutting.

In shown methods, the hub is extruded in the opposite direction than the hole was pierced. This removes any deformation caused by the piercing, such as any lip formed when the hole punch exits through the cap. As it is generally preferred that working forces are applied in a vertically-downward direction to take advantage of gravitational forces, the external surface of the cap 50 is oriented facing vertically downwardly during fabrication, and the internal surface 52 is oriented facing vertically upwardly. In these embodiments, the cap 12 is blanked and pierced downwardly from the internal surface side of the cap. The hub 20 is thus extruded in the vertically upward direction from the external surface side of the cap and axially-inwardly from the internal surface 52 of the cap, albeit by the vertically downward movement of the die press and forming punch.

It should be noted that when the arbor hole is initially-pierced prior to extrusion of the hub, sufficient material must be left in the hub region so that the hub may be extruded to its desired length (for desired threading, e.g., two full thread lengths) and desired hole diameter while maintaining adequate hub wall thickness and strength. Those of ordinary skill in the art will understand how to accomplish this, i.e., what diameter hole to initially pierce.

In this embodiment, however, the arbor hole is not extruded to its final diameter. Rather, after the hub is extruded, additional material thickness remains on the inside diameter of the hole. The extrusion process forms the hole with a slight angle to it. In addition, a lip of material may remain at the axially inward end of hole. Sufficient material must be left at the inner wall of the hub (the hole) so that the angle and lip may be removed without exceeding the desired internal diameter of the hole. The additional remaining material is removed so that the hole is made square (straight) to form the minor diameter of the threads 60. This is accomplished at a re-piercing station 170e by re-piercing the hole with a punch, or alternatively, is accomplished by other means as will be understood by those of ordinary skill in the art.

The drive pin apertures 24, slug removal apertures 26 and slug removal slots 28 are also formed at the re-piercing station 170e. They may be formed by piercing with a punch, or by other known methods. The pilot holes 34 may be used to position and align the cap for these operations also.

After the hole 22 is formed, the threads 60 are formed in the hole 22 at a tapping station 170f using known techniques to mate with the external threads of the arbor. The pilot holes 34 may be used to position and align the cap so that the threads are cut concentrically with the axis Y of the cap, which is also the axis of rotation of the hole cutter. In some embodiments, the threads may be cut with a cutting tap. In alternative embodiments, the threads are made with a forming tap that creates the threads by deforming (not cutting) the material. This work hardens the threads for greater strength.

When the hole cutter is heat treated, e.g., tempered, to relieve residual fabrication stresses, the thread hardness can be reduced but maintains sufficient strength to withstand the forces imposed by the arbor during cutting.

In embodiments of the invention as in FIG. 3b where the threads 160 are offset from the external surface, the upper portion of the hole 162 needs to be widened to accommodate the major diameter of the arbor threads in order for the arbor to be inserted into and connected to the cap 122. This may be done by know methods, such as machining by a cutting or boring tool. If the threads 160 are damaged by the machining process, the damaged threads 160 may need to be re-tapped. Alternatively, the upper portion 162 may be machined to the desired diameter prior to the initial tapping.

Figure 6:
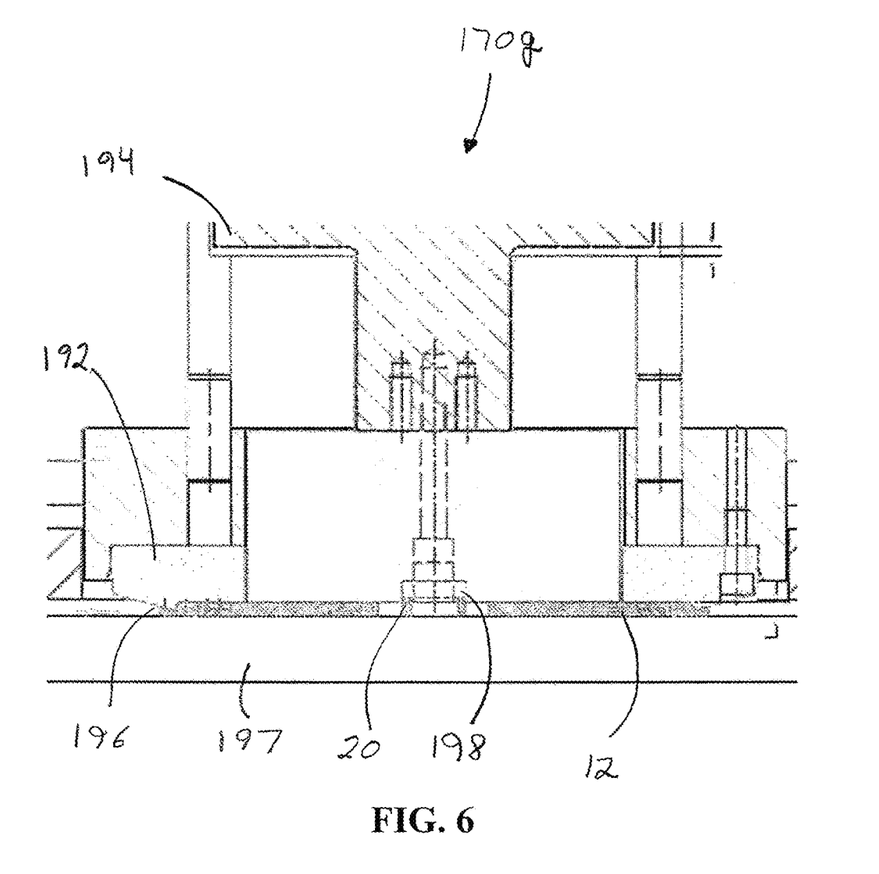
FIG. 6 is a schematic cross-sectional elevation view of an embodiment of a coining station according to the present invention.

At a coining station 170g, the flange 54, recess 56 and tapered portion 58 are formed, forming the "B" diameter and roughly forming the "A" diameter of the cap 12. In the depicted methods, the cap is coined, meaning that a die 192 is pressed or "struck" against the cap 12 by a press 194, and the cap material is thinned and flows outwardly. The die 192 is shaped complementary to the desired shape and size of the "B" diameter, flange 54, recess 56 and tapered portion 58. As the cap is coined, the material at the periphery of the cap 12 is pressed into the shape of the die 192, forming the "B" diameter," recess 56 and tapered portion 58. However, a gap 196 between the die 192 and a base 197 upon which the cap 12 is supported, the material flows outwardly through the gap, forming the flange 54 and roughly forming the "A" diameter of the cap 12. The "A" diameter is only roughly formed because the cap material is not radially constrained at the gap 196, and can flow unevenly and to a greater extent than the desired "A" diameter. This is preferred, so that the "A" diameter can be accurately formed, as discussed below. The die 192 also contains a recess 198 so that the hub 20 is not compressed or deformed.

The die 192 should be configured, and the press 194 should exert sufficient force, so that the cap material fully flows into the shape of the die 192, yet flows sufficiently outward at the gap 196 so that the "A" diameter can be formed. At the same time, the thickness of the cap T1 must not be overly reduced to compromise the rigidity and strength of the cap. Preferably, the thickness T1 is not reduced below about 0.134". Those of ordinary skill in the art will understand how to accomplish this.

At the end of the coining process, the "B" diameter, flange 54, recess 56 and tapered portion 58 are fully and accurately formed. Thus, the coining process provides the same result and dimensional accuracy as previous methods in which these features are machined in the cap plate, but does so more quickly and with less expense. However, forming these features by other methods, including machining, is also contemplated within the scope of the invention.

It is important that the "B" diameter is formed concentrically with the axis of rotation Y of the cap 12, so that when the blade body 14 is attached, the hole cutter 10 is symmetric around the axis. The pilot holes 34 may be used to position and align the cap 12 in the coining station 170g.

Figure 7:
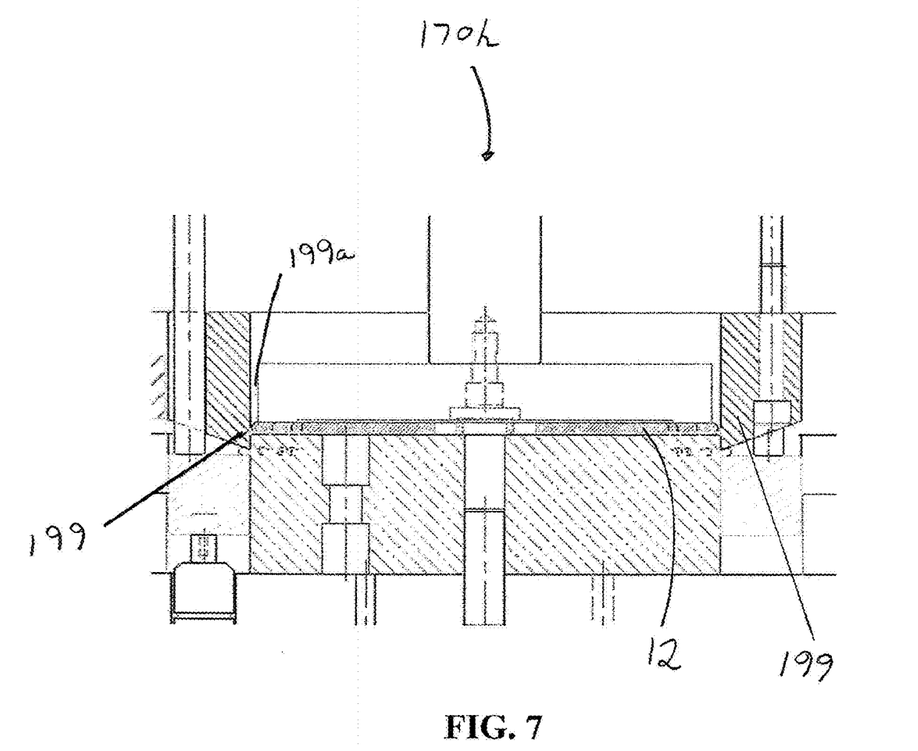
FIG. 7 is a schematic cross-sectional elevation view of an embodiment of a trimming station according to the present invention.

At a trim station 170h, the final "A" diameter is formed. The final "A" diameter may be formed using known methods, such as machining with a cutting tool or lathe. The "A" diameter is trimmed in the illustrated embodiment by a die 199 having an internal recess 199a with a diameter essentially equal to the desired "A" diameter. Any excess material on the "A" diameter after the coining process is trimmed and scraped, producing the desired "A" diameter. Like the "B" diameter, it is important that the "A" diameter is concentric with the axis of rotation Y. To assure this, the cap 12 can be positioned and aligned in the trim station 170h using the pilot holes 34.

In the embodiment of the invention shown in FIG. 4, the surface(s) of the cap is stippled prior to coining or forming the "B" diameter. Fabrication of an accurate "B" diameter is important to provide a dimensionally accurate hole cutter. In particular, the dimension and trueness (roundness) of "B" diameter is important to achieve an accurate and secure connection to the blade body. It is also desirable to have an accurate and true "A" diameter, though this is less critical due to the welding process.

Plate stock is typically coiled for ease of storage and transport. Prior to part fabrication, the coil is unrolled/flattened by a coil straightener. The coil is often unrolled/flattened at elevated temperature to soften the material so that it is more easily worked. However, to avoid altering the material structure, strength or dimensions, the temperature is far below that which would significantly reduce or eliminate the material "set" or "memory" induced by coiling. Accordingly, the blanked part, in this case the cap, contains residual internal stresses tending to bow or crown the blank from the desired flatness, particularly after various holes and apertures are made in the blank. If the blank is not sufficiently flat, the "A" and "B" diameters will not be formed accurately. This issue is more pronounced at larger diameters, and for the materials and thicknesses used in the current invention, can produce caps beyond the desired tolerances at diameters of three inches and larger.

Figure 8:
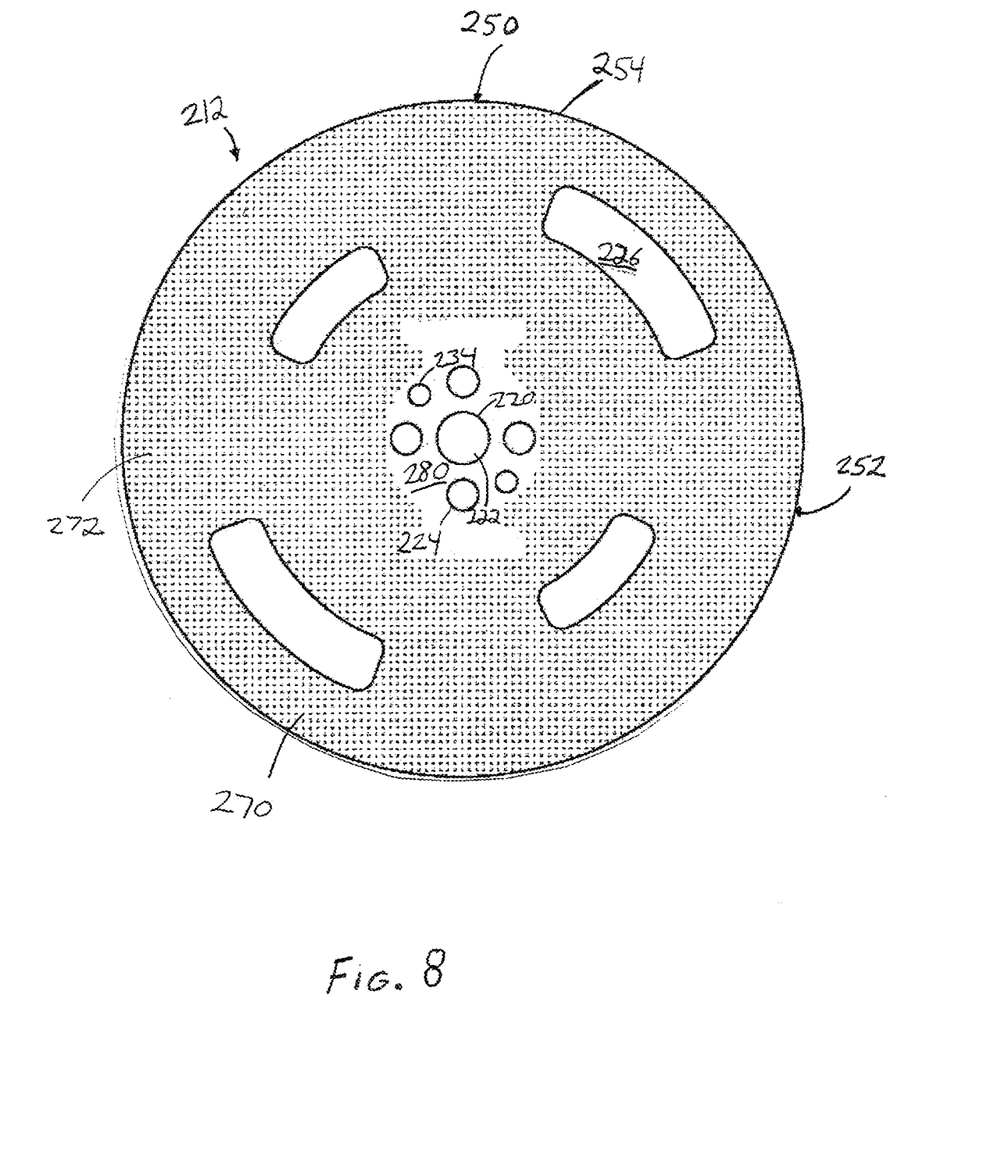
FIG. 8 is a plan view of a hole cutter cap in an embodiment of the present invention.

FIG. 8 shows another embodiment of a hole cutter plate cap. This embodiment is similar to the cap of FIGS. 1, 2, 3a and 3b, and utilizes similar reference numerals to reference similar parts, but with the reference numerals preceded by a "2." To reduce the internal stresses and obtain desired flatness, at least a portion of the external surface 250 is stippled 270 as shown in FIG. 8. The stippling 270 comprises a multitude of small recesses or indents 272 in the external surface of the cap 250. The stippling 270 may be random, or in a pre-determined pattern or crosshatch as shown in FIG. 8. The internal surface 252 of the cap 212 may also be stippled. Those of ordinary skill in the pertinent art will understand how to determine the depth, amount and pattern of stippling to sufficiently relieve the internal stresses in the cap and obtain sufficient flatness.

Figure 9A:
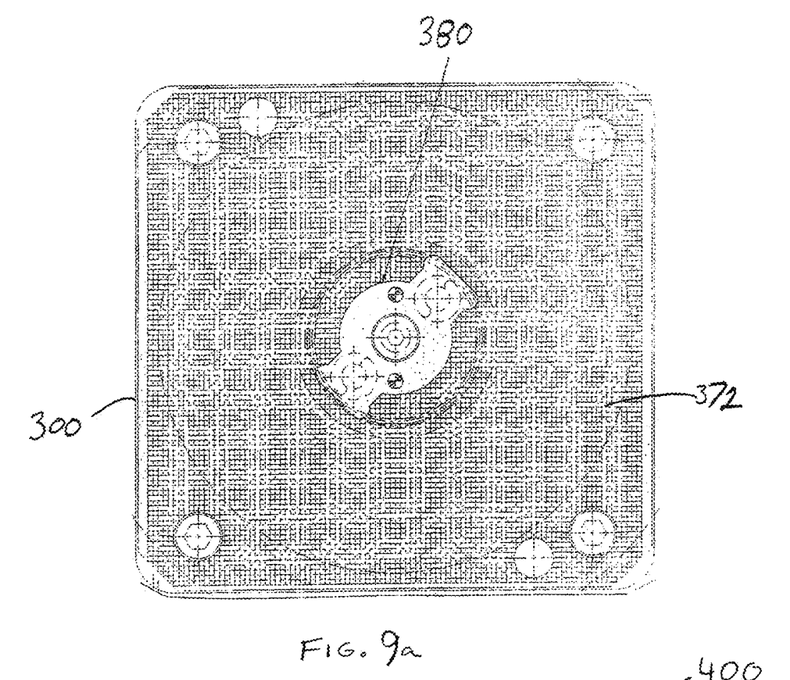
FIG. 9a is a plan view of a stippling punch as used in an embodiment of the present invention.

The stippling may be coined or pressed into the surface(s) as is known to those of ordinary skill at a stippling station 171. FIG. 9a is an embodiment of a stippling punch 300 of the type used to produce the stippling 270 as shown in FIG. 8. The punch 300 contains a pattern of raised knurls or punch points 372 that produce the recesses 272 in the cap 212. In the illustrated embodiments, the punch points have a pyramid shape cut at a 45° angle in both directions.

As will be understood by those of ordinary skill in the pertinent art, the punch, and particularly the punch points, is made of a harder material than the cap 212 so that the recesses 272 are formed without damaging the punch 300 and the shape of the recesses correspond to the punch points 372. Those of ordinary skill will understand how to provide such punches.

Figure 9B:
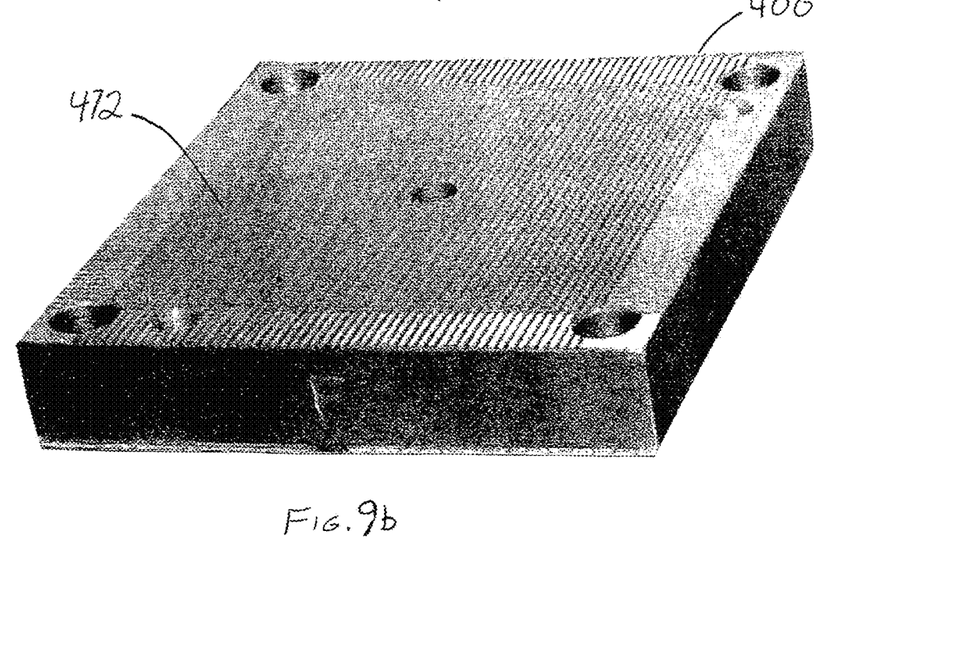
FIG. 9b is a perspective view of a stippling punch as used in another embodiment of the present invention.

As seen in FIG. 8, the cap 212 has a central area 280 that does not have stippling. The punch 300 has a corresponding central area 380 that does not have punch points. It has been found that it is generally unnecessary to stipple the central area 280 of the cap. This permits the region around the arbor hole 222, the drive pin holes 224 and the pilot holes 234 to remain smooth for better engagement with the arbor. This also allows the pilot holes 234 to be used to position the cap 212 relative to the stippling punch 300 for striking. Alternatively, a stippling punch 400 as shown in FIG. 9b may be used that has punch points 472 in the central area that creates stippling across the diameter of the cap.

In the embodiment of FIG. 4, stippling occurs prior to the tapping of the arbor hole. In embodiments where the central area of the cap is stippled (see FIG. 9b), the stippling does not damage any threads at or near the external surface of the cap.

Using the above-discussed fabrication methods, hole cutter caps for hole cutters according the present invention may be fabricated. The methods may be used to fabricate hole cutter caps and hole cutters of various sizes, diameters and lengths, various materials (steel, etc.) and various cutting applications (metal, wood, plastic, resin, etc.). It is contemplated, though, that the hole cutter caps and hole cutters can be made by other methods, and still considered within the scope of the invention. In addition, though the above-discussed fabrication steps are presented as being performed in a certain order, the various steps may be performed in a different order than describe above and within the scope of the invention.

Those of ordinary skill should understand that the plate stock used to fabricate the caps of the invention should be selected to produce the desired thickness T1 of the completed cap, e.g., at least 0.134". The reduction of the stock thickness during fabrication is dependent upon the material used (e.g., type of steel) and the fabrication process. A thinner stock will require less force to work, which means smaller, generally less expensive fabrication machinery. On the other hand, a thinner stock requires a larger blank and thus more plate stock, so that the material is not overly reduced in thickness when coining or extruding to the desired dimensions. In contrast, a thicker stock requires a smaller blank, and fewer linear feet of stock, as it may be coined/extruded to a greater degree without over-thinning the cap. Thicker stock requires larger, more powerful fabrication machinery. Those of ordinary skill will also understand that plate stock is typically milled in standard sizes and thicknesses, which should be taken into account in both selecting the stock to be used and the cap fabrication process.

Hole cutter caps of the present invention provide several advantages over existing hole cutter caps. The cap provides the strength and stability of a plate cap, as opposed to weaker drawn sheet metal caps, but uses significantly less material than existing thicker steel plate caps without extruded hubs. The extruded hub hole cutter caps of the present invention increase the effective thickness and strength of the plate in the hub area to about the same, or more than existing plate caps. The extruded hub also allows the threads to be positioned deeper in the hole cutter so that the interface between the plate cap and the arbor is secure adjacent to the external surface. The extruded-hub caps of the invention also provide more dimensional accuracy than sheet metal caps with simpler and less costly manufacture the plate caps.

It may be readily understood by those having skill in the pertinent art from the present disclosure that any of numerous changes and modifications may be made to the above-described and other embodiments of the present invention without departing from the scope of the invention as defined in the appended claims. For example, the hole cutters may be made from any of numerous different materials, in any of numerous shapes, taking any of numerous different dimensions. For example the cutting edge may be made from any of numerous different materials or combinations of materials that are currently known or that later become known. As an example, the cutting edge may be a bi-metal cutting edge, such as bi-metal cutting teeth. As another example, the cutting edge may take any form, pattern, arrangement or configuration that is currently known or that later becomes known, including without limitation tooth patterns that tend to function well in specific applications, hybrid applications or general applications. For example, the cutting teeth may define any of numerous different tooth forms, pitch patterns and/or set patterns. Also, the hole cutters may be used in any of numerous different cutting applications, on any of numerous different work piece materials, such as woods, metals, plastics, composites, resins, stones, fabrics, foams, etc. Accordingly, this detailed description of the currently preferred embodiments of the present invention is to be taken in an illustrative, as opposed to a limiting sense.

What is claimed is:

1. A hole cutter for cutting a work piece, comprising:
a plate steel cap defining substantially planar opposing external and internal surfaces, a periphery defining a flange, an extruded hub extending axially inwardly from the internal surface and defining an aperture extending through the plate cap and hub, wherein the aperture has a threaded portion extending along at least a portion of its length, and the hub extends axially inwardly from the internal surface a sufficient distance such that the threaded portion defines at least two full threads;
wherein at least a portion of at least one of the external surface and internal surface is stippled; and
an annular blade body extending axially from the cap, the blade body defining a cutting edge at a distal end from the cap.

2. A hole cutter as defined in claim 1, further comprising a recess between the opposing surfaces defining a "B" diameter.

3. A hole cutter as defined in claim 2, wherein the thickness of the cap between the "B" diameter and the hub is at least about 0.134".

4. A hole cutter as defined in claim 2, wherein the thickness of the cap between the "B" diameter and the hub is between about 0.134" and about 0.165".

5. A hole cutter as defined in claim 1, wherein the aperture is configured for engagement with an arbor.

6. A hole cutter as defined in claim 1, wherein the periphery further defines an "A" diameter of the hole cutter that is at least about 3".

7. A hole cutter as defined in claim 1, wherein the threaded portion is axially-inwardly offset from the external surface.

8. A hole cutter as defined in claim 1, wherein a portion of the external surface surrounding the aperture is not stippled.

9. A hole cutter as defined in claim 1, wherein recesses in the stippled portion define pyramid shapes.

10. A hole cutter as defined in claim 9, wherein the pyramid shapes define 45° angles.

11. A hole cutter as defined in claim 1, wherein the threaded portion extends within a portion of the aperture defined by the hub.

12. A hole cutter as defined in claim 1, wherein at least a portion of the threaded portion extends into a portion of the aperture located axially inwardly from the internal surface.

13. A hole cutter as defined in claim 1, wherein the threaded portion is axially offset from the external surface.

14. A hole cutter as defined in claim 1, wherein a portion of the aperture is unthreaded.

15. A hole cutter as defined in claim 1, wherein the thickness of the plate cap and hub is at least about 0.187 inches.

16. A method of manufacturing a hole cutter, comprising:
forming a cap blank from plate steel defining generally planar external and internal opposing surfaces;
forming a flange at a periphery of the cap blank;
forming an aperture though the cap blank extending from the external surface to the internal surface and defining an axis that is substantially perpendicular to the external and internal surfaces;
extruding the cap blank at the aperture to form a hub extending along the axis inwardly from the external surface and past the internal surface, wherein the aperture extends through the hub; and
threading at least a portion of the aperture to form a threaded portion configured for engagement with an arbor;
stippling at least a portion of at least one of the external and internal surfaces;
attaching an axially-extending annular blade body to the cap blank, wherein the blade body defines a cutting edge at a distal end from the cap blank; and
wherein the extruding step comprises extruding the hub sufficiently past the internal surface such that the threaded portion defines at least two full threads.

17. A method as defined in claim 16, wherein, after extruding, the hub has a length in a direction of the axis of at least about 0.187".

18. A method as defined in claim 16, wherein the threaded portion is formed axially offset from the first surface in a direction toward the internal-sec-end surface.

19. A method as defined in claim 16, further comprising forming a "B" diameter between the external and internal surfaces.

20. A method as defined in claim 19, wherein the "B" diameter is formed by coining the cap blank with a die.

21. A method as defined in claim 20, wherein after the coining step, the thickness of the cap blank between the "B" diameter and the hub is at least about 0.134".

22. A method as defined in claim 21, wherein the thickness of the cap blank between the "B" diameter and the hub is between about 0.134" and about 0.165".

23. A method as defined in claim 16, further comprising forming an "A" diameter at the periphery of the cap blank.

24. A method as defined in claim 23, wherein the "A" diameter is formed by trimming the periphery with a die.

25. A method as defined in claim 16, wherein a portion of the first surface surrounding the aperture is not stippled.

26. A method as defined in claim 16, wherein the stippling step comprises forming surface recesses defining pyramid shapes.

27. A method as defined in claim 26, wherein the pyramid shapes define 45° angles.

28. A method as defined in claim 16, wherein the stippling is formed using a punch.

29. A hole cutter for cutting a work piece formed by a method comprising the steps of:
forming a cap blank from plate steel defining generally planar external and internal opposing surfaces;
forming a flange at a periphery of the cap blank;
forming an aperture though the cap blank extending from the external surface to the internal surface and defining an axis that is substantially perpendicular to the external and internal surfaces;
extruding the cap blank at the aperture to form a hub extending along the axis inwardly from the external surface and past the internal surface, wherein the aperture extends through the hub;
threading at least a portion of the aperture to form a threaded portion configured for engagement with an arbor;
stippling at least a portion of at least one of the external and internal surfaces;
attaching an axially-extending annular blade body to the cap blank, wherein the blade body defines a cutting edge at a distal end from the cap blank;
wherein the extruding step comprises extruding the hub sufficiently past the internal surface such that the threaded portion defines at least two full threads.

30. A hole cutter as defined in claim 29, wherein attaching the axially extending annular blade body to the cap blank comprises welding the annular blade body to the cap blank.

31. A hole cutter as defined in claim 29, wherein the hub has a length in a direction of the axis of at least about 0.187".

32. A hole cutter as defined in claim 29, wherein the threaded portion is axially-offset from the external surface in a direction toward the internal surface.

33. A hole cutter as defined in claim 29, the method further comprising forming a "B" diameter between the external and internal surfaces.

34. A hole cutter as defined in claim 33, wherein the "B" diameter is formed by coining the cap blank with a die.

35. A hole cutter as defined in claim 33, wherein the thickness of the cap blank between the "B" diameter and the hub is between about 0.134" and about 0.165".

36. A hole cutter as defined in claim 33, the method further comprising forming an "A" diameter at the periphery of the cap blank.

37. A hole cutter as defined in claim 36, wherein the "A" diameter is formed by trimming the periphery with a die.

38. A hole cutter as defined in claim 36, wherein the "A" diameter is at least about 3".

39. A hole cutter as defined in claim 33, wherein the thickness of the cap blank between the "B" diameter and the hub is at least about 0.134".

40. A hole cutter as defined in claim 29, wherein a portion of the first surface surrounding the aperture is not stippled.

41. A hole cutter as defined in claim 29, wherein recesses in the stippled portion define pyramid shapes.

42. A hole cutter as defined in claim 41, wherein the pyramid shapes define 45° angles.

43. A hole cutter as defined in claim 29, wherein the stippling is formed using a punch.

* * * * *